United States Patent
Harless et al.

(10) Patent No.: US 9,533,901 B2
(45) Date of Patent: Jan. 3, 2017

(54) METHOD FOR CONTROL OF DELETERIOUS MICROBES IN OIL AND GAS AND OTHER INDUSTRIAL FLUIDS

(71) Applicants: Michael Harless, Humble, TX (US); Edward Corrin, Houston, TX (US)

(72) Inventors: Michael Harless, Humble, TX (US); Edward Corrin, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 746 days.

(21) Appl. No.: 13/845,677

(22) Filed: Mar. 18, 2013

(65) Prior Publication Data

US 2014/0263038 A1  Sep. 18, 2014

(51) Int. Cl.
  *C02F 3/00* (2006.01)
  *C02F 3/34* (2006.01)
  *C02F 1/68* (2006.01)
  *C09K 8/528* (2006.01)
  *C02F 101/10* (2006.01)
  *C02F 1/50* (2006.01)
  *C02F 3/30* (2006.01)

(52) U.S. Cl.
  CPC . *C02F 3/34* (2013.01); *C02F 1/68* (2013.01); *C09K 8/528* (2013.01); *C02F 1/50* (2013.01); *C02F 3/305* (2013.01); *C02F 2101/101* (2013.01); *C02F 2305/06* (2013.01); *C09K 2208/20* (2013.01)

(58) Field of Classification Search
  CPC ............ C02F 2303/02; C02F 2101/101; C02F 2307/08; C02F 2209/26; C02F 2303/08; C02F 2605/06; C02F 3/341
  USPC .................................. 210/210, 916; 166/246
  See application file for complete search history.

(56) References Cited

U.S. PATENT DOCUMENTS

| | | |
|---|---|---|
| 4,879,240 A | 11/1989 | Sublette et al. |
| 5,385,842 A | 1/1995 | Weimer et al. |
| 5,500,368 A | 3/1996 | Tatnall |
| 5,750,392 A | 5/1998 | Hitzman et al. |
| 2011/0233146 A1 | 9/2011 | Harshman et al. |
| 2012/0067566 A1 | 3/2012 | Durham et al. |
| 2012/0213662 A1 | 8/2012 | Matheis et al. |
| 2012/0305476 A1* | 12/2012 | Giudici-Orticoni et al. . 210/605 |

FOREIGN PATENT DOCUMENTS

| | | |
|---|---|---|
| JP | 2001-187703 A | 7/2001 |
| WO | 99/06326 A1 | 2/1999 |

OTHER PUBLICATIONS

Burger, Edward D., NACE Paper 04750, "Synergism of Anthraquinone with an Oilfield Biocide to Inhibit Sulfide Generation from Sulfate-Reducing Bacteria" (2004), 11 pages.
Johnson, M.D. et al., SPE Paper 50741-MS, "A New Chemical Approach to Mitigate Sulfide Production in Oilfield Water Injection Systems", Feb. 1999, 9 pages.
Burger, E.D. et al., SPE Paper 50764-MS, "Mechanisms of Anthraquinone Inhibitions of Sulfate-Reducing Bacteria," Feb. 1999, 6 pages.
Burger, E.D. et al., SPE Paper 106106-PA, "Flexible Treatment Program for Controlling H2S in FPSO Produced-Water Tanks", Feb. 2007, 9 pages.
Burger, E.D. et al., NACE Paper 01274, "Inhibition of Sulfate-Reducing Bacteria by Anthraquinone in a Laboratory Biofilm Column Under Dynamic Conditions" (2001), 17 pages.
Law, M.D., SPE Paper 65023-MS, "A Field Case History: Chemical Treatment of a Produced-Water Injection System Using Anthraquinone Improves Water Quality and Reduces Costs", Feb. 2001, 8 pages.
Hubert, Casey et al., "Oil Field Souring Control by Nitrate-Reducing *Sulfurospirillum* spp. That Outcompete Sulfate-Reducing Bacteria for Organic Electron Donors," Appl. and Environ. Microbiol. 2007, 73(8):2644. 10 pages.
Gevertz, Diane et al., "Isolation and Characterization of Strains CVO and FWKO B, Two Novel Nitrate-Reducing, Sulfide-Oxidizing Bacteria Isolated from Oil Field Brine," Appl. Environ. Microbiol. 2000, 66(6): 2491. 12 pages.
Dennis, D. M. et al., SPE Paper 106154-MS, "Advanced Nitrate-Based Technology for Sulfide Control and Improved Oil Recovery", Feb. 2007, 10 pages.
International Search Report and Written Opinion issued in related PCT Application No. PCT/US2014/024039 mailed Jun. 5, 2014, 11 pages.
International Preliminary Report on Patentability issued in related PCT Application No. PCT/US2014/024039 mailed Oct. 1, 2015 (8 pages).

* cited by examiner

*Primary Examiner* — Nam Nguyen
*Assistant Examiner* — Claire Norris
(74) *Attorney, Agent, or Firm* — Tenley R. Krueger; Baker Botts L.L.P.

(57) ABSTRACT

A method of controlling sulfides in water systems is disclosed which includes injecting 9,10 anthraquinone into the water system and injecting a nitrate or nitrite into the water system.

16 Claims, No Drawings

METHOD FOR CONTROL OF DELETERIOUS MICROBES IN OIL AND GAS AND OTHER INDUSTRIAL FLUIDS

BACKGROUND

Field

The disclosure relates generally to the field of souring and microbiologically influenced corrosion in oil and gas production and completion fluids, as well as other industrial waters. More specifically the disclosure relates to methods for introducing controlling souring and microbiologically influenced corrosion by deleterious microbes.

Background Art

Oil and gas production and completion fluids, as well as other industrial fluids, suffer corrosion, pipe necking (partial blockage) and scale buildup in pipes and pipelines. Sources of these problems include microbially influenced corrosion (MIC) corrosion, solids produced by metabolite byproducts, and bio-film blockages. Microbes may also negatively affect oil and natural gas recovery through bacterial fouling of the water needed to hydrofracture ("frac") reservoir rock or to "water-flood," to increase production of oil and gas. One particular type of microbe, sulfate reducing bacteria (SRB) can contaminate or "sour" the reservoir by producing hydrogen sulfide ($H_2S$). SRBs may produce toxic and flammable $H_2S$, which may shorten the lifetime of piping and tankage, and introduce additional safety risks from drill rig to refinery. This $H_2S$ may react with soluble iron to produce iron sulfide. Acid producing bacteria (APB) produce acids, including a variety of organic acids, which lead to additional corrosion. SRBs and APBs may have the same effects in other oil and gas completion fluids, as well as other industrial fluids.

Traditional approaches to microbial control in oilfield and industrial waters have focused on the use of chemicals that are toxic to the target organisms (biocides). Unfortunately, the biocides are toxic to other organisms and may have significant deleterious impact to the environment.

SUMMARY

In one embodiment of the present disclosure, a method of controlling sulfides in water systems is disclosed which includes injecting 9,10 anthraquinone into the water system and injecting an organic or inorganic nitrate or nitrite into the water system.

DETAILED DESCRIPTION

The following disclosure provides many different embodiments, or examples, for implementing different features of various embodiments. Specific examples of components and arrangements are described below to simplify the present disclosure. These are, of course, merely examples and are not intended to be limiting.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

The present disclosure describes in certain embodiments the combined use of 9,10-anthraquinone and a nitrate or a nitrite. In other embodiments, Nitrogen-containing compound Reducing Bacteria (NRB) in combination with a nitrate or a nitrite.

9,10-anthraquinone is a metabolic inhibitor of SRBs that interferes with respiration and Adenosine-5'-triphosphate (ATP) formation of the SRB. 9,10-anthraquinone may form small particles in the pH ranges typically encountered in oilfield and industrial water systems. These particles are small enough to penetrate into biofilms and may also form a thin film on the surfaces of the system being treated. 9,10-anthraquinone is typically insoluble or only slightly soluble in oilfield and industrial waters. In certain embodiments, this lack of solubility allows a durable coating to be formed on the system surfaces. In certain embodiments, the 9,10-anthraquinone is not continuously applied, but may be periodically applied replenish the 9,10-anthraquinone coating as it slowly dissolves or erodes. The 9,10-anthraquinone may be added in quantities sufficient to achieve a concentration of between 5 ppm and 1000 ppm by weight or between 50 and 500 ppm by weight in the solution.

9,10-anthraquinone may not provide the requisite amount of control of SRBs required for certain oilfield and industrial water systems. While supplemental batch applications of traditional biocides may be used to achieve the desired level of biological control in certain embodiments, biocide batch applications may only provide short term control. In these embodiments, after the biocide has moved through the system the bacteria may repopulate the system. Biocides may be expensive. Further, some biocides, such as, for instance, glutaraldehye, present environmental issues. Ground water may be contaminated with the biocide, for instance. Further, more reactive biocides such as oxidizers tend to have a limited lifespan and may be difficult with which to work.

In certain embodiments of the present disclosure, in addition to 9,10 anthraquinone, inorganic nitrates or inorganic nitrites may be injected into the oilfield or industrial water system to stimulate NRBs as a control mechanism for SRB in place of a traditional biocide. Molybdates also may be used in conjunction with the inorganic nitrates or inorganic nitrites as a control mechanism for SRB.

SRB and NRB typically compete for the same non-polymer carbon source (such as acetates) present in certain oilfield and industrial water systems needed for growth of bacteria. By increasing the growth rate of the NRB in comparison to the SRB, the NRB may out compete the SRB in consumption of the available non-polymer carbon source, depriving the SRB of its ability to grow and create the undesirable sulfides and reduce corrosion rates. Further, by inhibiting the growth rate of the SRB, the NRB may predominate, again out competing the SRB for the available non-polymer carbon in the certain oilfield and industrial water systems.

Organic and inorganic nitrates and nitrites serve to stimulate the growth of the NRB present in the certain oilfield and industrial water systems, thus outcompeting SRB present in the formation. Organic and inorganic nitrates or inorganic nitrites may be used injected into the certain oilfield and industrial water systems. Inorganic nitrates and inorganic nitrites available for use in the present disclosure include, for instance, potassium nitrate, sodium nitrate, ammonium nitrate, and mixtures thereof. These organic and inorganic nitrates and inorganic nitrites are commonly available, but are non-limiting and any appropriate inorganic nitrate may be used.

The amount of organic or inorganic nitrate or nitrite used is dependent upon a number of factors, including the amount of sulfate and/or organic acids present in the oilfield and industrial water systems, and the expected amount of NRB needed to counteract the SRB. In certain embodiments of the present disclosure, the concentration of organic or inorganic nitrate or nitrite in the oilfield or industrial water systems may be less than 2000 ppm by weight of the water solution, alternatively 500 to 1600 ppm by weight or alternatively between about 900 and 1100 ppm by weight when applied using a batch application method. When applied through continuous operation, the concentration of the organic or inorganic nitrate or nitrite may be less than 500 ppm by weight, alternatively between 10 and 500 ppm, or alternatively between 10 and 100 ppm.

In certain circumstances, such as when the indigenous amount of NRB is inadequate or wholly absent in oilfield and industrial water systems, it may be necessary to supplement the indigenous NRB with suitable additional NRB. Thus, in certain embodiments of the present disclosure, NRB are added to the certain oilfield and industrial water systems.

Those of ordinary skill in the art with the benefit of this disclosure will recognize acceptable examples of NRB appropriate for use in this disclosure. NRB include any type of microorganism capable of performing anaerobic nitrate reduction, such as heterotrophic nitrate-reducing bacteria, and nitrate-reducing sulfide-oxidizing bacteria. This may include, but is not limited to, *Campylobacter* sp. *Nitrobacter* sp., *Thiobacillus* sp., *Nitrosomonas* sp., *Thiomicrospira* sp., *Sulfurospirillum* sp., *Thauera* sp., *Paracoccus* sp., *Pseudomonas* sp., *Rhodobacter* sp., or Specific examples include, but are not limited to, *Nitrobacter vulgaris, Nitrosomonas europea, Pseudomonas stutzeri, Pseudomonas aeruginosa, Paracoccus denitrificans, Sulfurospirillum deleyianum*, and *Rhodobacter sphaeroides*.

The amount of NRB included in the fracturing fluid will depend upon a number of factors including the amount of SRB and/or organic acids expected. In certain embodiments of the present disclosure, the amount of NRB in the oilfield or industrial water systems is between $10^1$ and $10^8$ bacteria count/ml of the fluid, or alternatively between $10^1$ and $10^4$ bacteria count/ml of the fluid.

NRB of the present disclosure may convert organic or inorganic nitrates to nitrites. In addition, in certain embodiments of the present disclosure, the NRB of the present disclosure also may convert nitrites to ammonia. In certain other embodiments of the present disclosure, the NRB of the present disclosure may convert ammonia to nitrogen gas. It has further been found that nitrites may scavenge hydrogen sulfide, further reducing souring. Organic or inorganic nitrites include, for instance, without limitation sodium nitrite, sodium nitrate, potassium nitrate and potassium nitrite, and are typically added in the range of between about 5 and 100 ppm by weight of the fluid.

In addition to stimulating the NRB to out compete the SRB, it may be desirable to introduce additional SRB inhibitors in certain embodiments of the present disclosure together with the inorganic nitrates. Examples of SRB inhibitors suitable for the present disclosure are molybdates and molybdate salts, such as sodium molybdate and lithium molybdate, although any SRB inhibitor may be used in concentrations where the molybdates do not unduly affect the ability of the NRB to otherwise out compete the SRB. In certain embodiments of the present disclosure, molybdate or molybdate salt is added to the fluid in the range of 5 to about 100 ppm by weight of fluid.

Thus, as described in the present disclosure, less effective and less environmentally-sensitive biocides may be replaced with long-acting alternatives. In addition, it may be advantageous, particularly in environmentally sensitive situations, such as where possibility of ground water or fresh water contamination exists, to substitute traditionally used toxic components with less toxic alternatives.

In certain embodiments of the present disclosure, an anthraquinone treatment is applied to provide a coating on the interior surfaces of the system. Supplemental NRB/nitrate treatments will applied as necessary to provide the additional control that is typically achieved with conventional biocides. Treatment frequencies of both products will vary based on system condition such as, water temperature, nutrient loading, flow regime, bacteria population composition, etc. Actual treatment frequencies will be determined based on empirical field monitoring data. In certain embodiments, the system is treated with 9,10-anthraquinone 1 to 4 times per month with NRB/nitrate or nitrite applications 1-2 times per week.

The various embodiments of the present disclosure can be joined in combination with other embodiments of the disclosure and the listed embodiments herein are not meant to limit the disclosure. All combinations of embodiments of the disclosure are enabled, even if not given in a particular example herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

While the foregoing is directed to embodiments, versions and examples of the present disclosure, which are included to enable a person of ordinary skill in the art to make and use the disclosures when the information in this patent is combined with available information and technology, the disclosure is not limited to only these particular embodiments, versions and examples. Also, it is within the scope of this disclosure that the aspects and embodiments disclosed herein are usable and combinable le with every other embodiment and/or aspect disclosed herein, and consequently, this disclosure enabling for any and all combinations of the embodiments and/or aspects disclosed herein. Other and further embodiments, versions and examples of the disclosure may be devised without departing from the basic scope thereof and the scope thereof is determined by the claims that follow.

What is claimed is:

1. A method comprising: injecting 9,10 anthraquinone into a water system; injecting a nitrate or nitrite into the water system; injecting nitrogen reducing bacteria into the water system; and injecting a molybdate or molybdate salt into the water system.

2. The method of claim 1, wherein the 9,10 anthraquinone is continuously injected or periodically injected at a pre-set frequency.

3. The method of claim 1, wherein the nitrate or nitrite is injected at a pre-set frequency in an amount sufficient to achieve a concentration of less than 2000 ppm by weight in the water system.

4. The method of claim 2, wherein the nitrate or nitrite is continuously injected in an amount to achieve a concentration of less than 500 ppm by weight in the water system.

5. The method of claim 1, wherein the nitrate or nitrite is inorganic.

6. The method of claim 3, wherein the nitrate is selected from the group consisting of: potassium nitrate, sodium nitrate, ammonium nitrate, and any combination thereof.

7. The method of claim 3, wherein the nitrite is potassium nitrite or sodium nitrite.

8. The method of claim 1 wherein the nitrogen reducing bacteria is selected from the group consisting of: *Campylobacter* sp., *Nitrobacter* sp., *Nitrosomonas* sp., *Thiomicrospira* sp., *Sulfurospirillum* sp., *Thauera* sp., *Paracoccus* sp., *Pseudomonas* sp., *Rhodobacter* sp., *Desulfovibrio* sp., and any combination thereof.

9. The method of claim 8 wherein the nitrogen reducing bacteria is selected from the group consisting of: *Nitrobacter vulgaris, Nitrosomonas europea, Pseudomonas stutzeri, Pseudomonas aeruginosa, Paracoccus denitrificans, Sulfurospirillum deleyianum, Rhodobacter sphaeroides*, and any combination thereof.

10. The method of claim 1, wherein the nitrogen reducing bacteria is injected in an amount to achieve a concentration of between 10 and $10^8$ nitrogen reducing bacteria count/ml in the water system.

11. The method of claim 1 wherein the molybdate salt is selected from the group consisting of: sodium molybdate, lithium molybdate, and any combination thereof.

12. The method of claim 1, wherein the amount of molybdate or molybdate salt added is sufficient to achieve a concentration of 5 to about 100 ppm by weight in the water system.

13. The method of claim 1, wherein the 9,10-anthraquinone is added in quantities sufficient to achieve a concentration of between 5 ppm and 1000 ppm by weight in the water system.

14. A method comprising: injecting 9,10 anthraquinone into an oilfield water system; injecting a nitrate or nitrite into the oilfield water system; injecting nitrogen reducing bacteria into the oilfield water system; and injecting a molybdate or molybdate salt into the oilfield water system.

15. The method of claim 14 wherein the nitrogen reducing bacteria is selected from the group consisting of: *Campylobacter* sp., *Nitrobacter* sp., *Nitrosomonas* sp., *Thiomicrospira* sp., *Sulfurospirillum* sp., *Thauera* sp., *Paracoccus* sp., *Pseudomonas* sp., *Rhodobacter* sp., *Desulfovibrio* sp., and any combination thereof.

16. The method of claim 14 wherein the nitrogen reducing bacteria is selected from the group consisting of: *Nitrobacter vulgaris, Nitrosomonas europea, Pseudomonas stutzeri, Pseudomonas aeruginosa, Paracoccus denitrificans, Sulfurospirillum deleyianum, Rhodobacter sphaeroides*, and any combination thereof.

* * * * *